US005635300A

United States Patent [19]

Kostikov et al.

[11] Patent Number: 5,635,300
[45] Date of Patent: Jun. 3, 1997

[54] PROCESS FOR PRODUCING ARTICLES OF CARBON-SILICON CARBIDE COMPOSITE MATERIAL AND CARBON-SILICON CARBIDE COMPOSITE MATERIAL

[75] Inventors: Valery I. Kostikov; Alexander V. Demin; Sergey A. Kolesnikov; Vasily V. Konokotin; Raisa N. Ponkratova, all of Moscow, Russian Federation

[73] Assignees: NII Grafit Research Institute, Russian Federation; Aerospatiale Societe Nationale Industrielle, France

[21] Appl. No.: 464,798

[22] PCT Filed: Dec. 23, 1993

[86] PCT No.: PCT/FR93/01297

§ 371 Date: Jun. 26, 1995

§ 102(e) Date: Jun. 26, 1995

[87] PCT Pub. No.: WO94/15888

PCT Pub. Date: Jul. 21, 1994

[30] Foreign Application Priority Data

Dec. 30, 1994 [RU] Russian Federation ........ 92015952/33

[51] Int. Cl.$^6$ ..................................................... B32B 9/00
[52] U.S. Cl. ....................... 428/408; 427/373; 427/385.5; 442/179
[58] Field of Search .................................... 428/272, 408; 427/373, 385.5

[56] References Cited

U.S. PATENT DOCUMENTS 4,397,901  8/1983  Warren ..................... 428/101
4,540,674  9/1985  Watanabe et al. ............ 501/97
5,051,300  9/1991  Rousseau .................... 428/245

FOREIGN PATENT DOCUMENTS

| 0493148 | 7/1992 | European Pat. Off. ........ C04B 35/80 |
| 2635773 | 3/1990 | France ........................ C04B 41/88 |
| 3329250 | 8/1984 | Germany ...................... C04B 35/68 |
| 2091270 | 3/1990 | Japan . | |

*Primary Examiner*—Christopher Raimund
*Attorney, Agent, or Firm*—Hayes, Soloway, Hennessey, Grossman & Hage, P.C.

[57] ABSTRACT

The invention relates to the field of structural materials intended for operation under conditions of thermal loading in oxidizing media and useful in working units and equipment for petroleum, chemical, aircraft, and metallurgy industries. The invention makes it possible to obtain a material having increased strength properties, heat resistant to oxidizers at a temperature over 1100° C. and ensuring a desired serviceability of parts without additional protective coatings under these conditions. This is attained due to producing a material being a composition of two interpenetrating skeletons: carbon fibers and silicon carbide disposed all through the material structure; the silicon carbide skeleton being the result of interaction between the matrix carbon and silicon self-propagating from outside. The process if characterized by a relatively short production cycle associated with singly conducted operations.

6 Claims, No Drawings

PROCESS FOR PRODUCING ARTICLES OF CARBON-SILICON CARBIDE COMPOSITE MATERIAL AND CARBON-SILICON CARBIDE COMPOSITE MATERIAL

FIELD OF THE INVENTION

The present invention relates to the field of structural materials operable under heavy thermal loading and in oxidizing media and can be useful in chemical, petroleum, metallurgy, and aircraft industries, to produce articles and structural elements able to withstand aggressive media, such as linings of chambers for neutralizing ecologically unsafe substances, nozzles, crucibles, parts of high-temperature turbines subject to heavy mechanical loads under service conditions.

DESCRIPTION OF PRIOR ART

There are known in the art various processes for producing materials reinforced by carbon fibers and oxidation protected to prevent rapid damage under service conditions of the material carbon-carbon basis which carries all the mechanical loads. Generally, the oxidation protection of such materials is attained via forming a heat-resistant silicon carbide layer on the surface thereof.

Known in the art is a process for producing composite articles, wherein first of all a carbon-plastic preform is prepared on the basis whereof a coke matrix is formed by heating the preform up to 1000° C. The resulting composite is twice densified via pitch impregnation, the latter being carbonized.

To form a surface protective SiC layer, the resulting carbonized preform is heat treated in a filling consisting of silicon carbide and silicon, thereby forming a SiC surface layer about 400 µm thick (JP, A, 2-91270).

The article material protection (as a separate process) in the form of a surface SiC layer having CTE different from that of the carbon-carbon basis, causes the SiC layer cracking under cooling, and, accordingly, rapid damage of the basis under service conditions in view of an oxidizer penetration thereto through the cracks.

Furthermore, the carbon-carbon basis low modulus of elasticity makes it impossible to use articles made of such a material in structures requiring a high rigidity.

Also known in the art is a process for producing composite articles, wherein onto a premolded fibrous preform in the form of wool, yarn, etc. (for example a plate of 200× 100×25 mm) pyrolytic carbon is CVD deposited, and a protective SiC coating is then formed by immersing the fibrous preform into a silicon melt (U.S. Pat. No. 4,397,901). In this case a portion of the pyrolytic carbon is converted into silicon carbide on the article fibers.

The pyrolytic carbon deposition directly onto the fibers, without the step of forming a carbon-plastic preform and on its basis a coke matrix, results in a preform having low strength properties (brittle), insofar as the carbon fibers appear not to be bonded with the matrix, are in a movable state, and do not take over the loads.

Moreover, when using this process, a large amount of free silicon remains in the matrix which decreases the article operating temperature level and increases the residual stresses in the material (in view of silicon expansion under cooling), which decreases its strength as well. Siliconizing in a silicon melt not only causes ecologically unsafe evaporations, but also requires rather expensive equipment, and in case of large-size articles the problems are getting still more serious.

Further known in the art is a process for producing a structural material, wherein a carbon-plastic preform reinforced by carbon fibers is obtained, and a pyrolytic carbon coating is used, however the latter is applied directly onto the fibers prior to the matrix formation. The resulting fibrous basis is then subjected to multiple densifications with a thermosetting binder modified with fine-dispersed SiC additives for SiC-forming components. Upon carbonization followed by heat treatment a material is obtained in the coke matrix whereof separate SiC inclusions are present (FR, B, 2,635,773).

Using a separate process, by treating in a filling containing silicon and silicon carbide with an alumina additive, a protective SiC layer is formed on the article surface. Then, in view of the SiC layer cracking under cooling, onto the $1^{st}$ SiC layer surface is CVD deposited a $2^{nd}$ SiC layer to cover the cracks.

Such a process fails to make it possible to retain the material serviceability in case the surface protective layer is damaged, inasmuch as precoating the carbon fibers with a thin SiC layer cannot ensure a proper load-carrying capacity of the material when the carbon-carbon basis is oxidized. Therefore the reliability of the surface protective coating is of a special concern (the coating is made multilayer).

Despite the presence of silicon carbide inclusions in the coke matrix, the modulus of elasticity of the material obtained by this process remains low in view of the carbon constituent predominance in the matrix, wherefore the material is non-useful in structures requiring a high shape stability.

DISCLOSURE OF INVENTION

The essence of the present invention resides in developing such a production process which while being simple and relatively non-durable (due to the densification cycle) would ensure the production of carbon-silicon carbide articles possessing high rigidity and shape stability, as well as being capable to carry loads even after the surface protective layer damage, at least, till the article working cycle under service conditions (up to 1500°–1600° C.) is completed, safely being ensured.

The problem pursued is solved due to the fact that according to the presently claimed process for producing articles of a carbon-silicon carbide composite material which comprises obtaining a carbon-plastic preform from carbon fibers and a thermosetting binder, heat pretreating thereof till a coke matrix reinforced by carbon fibers is formed, followed by densifying the coke matrix and siliconizing, the densification of the coke matrix reinforced by carbon fibers is effected via infiltration thereof with pyrolytic carbon, and prior to siliconizing the pyrolytic carbon deposited is crystallized and pore channels are formed by heat treating the densified preform at a temperature of 1900° to 2000° C., and while siliconizing a silicon carbide skeleton is formed in the pore space of the resulting preform.

In this specification, the word "plastic" means a modified or unmodified natural organic resin, or a semi-synthetic or synthetic organic resin obtained by polymerization or polycondensation.

In the preform, carbon fibers can be for example in the form of a woven fabric or a woven substrate.

The siliconizing charge is prepared as a mixture of boron and silicon powders taken in the following ratio, % by weight:

Silicon . . . 85 to 9

Boron ... 5 to 15.

Preferably the mixture is prepared using an organic binder, and prior to siliconizing the mixture is uniformly spread directly over the article surface, and siliconizing is effected at a temperature of 1800° to 2000° C.

Such a sequence of operations makes it possible in a relatively simple and sort process to ensure rigidity and stability of the material and retain the serviceability thereof not only due to the silicon carbide surface layer (formed in a separate process not considered here), but first of all due to the formation of a rigid silicon carbide skeleton within the article structure which penetrates the skeleton of the material carbon basis.

The infiltration of the coke matrix reinforced by carbon fibers with pyrolytic carbon, in combination with the other operations, is directed to providing conditions for the subsequent formation of the second skeleton, silicon carbide one, within the carbon basis skeleton. At the step of the coke matrix densification with pyrolytic carbon a possibility is laid of forming intercommunicating ways (pore channels) for silicon penetration into the material structure by virtue of the capillary forces and diffusion, and of creating the silicon carbide skeleton with a full conversion of silicon into silicon carbide. This possibility resides in that pyrolytic carbon when filling the coke matrix decreases the size of open pores, which in the instant case serve as a "casting mold" for obtaining the skeleton. Upon infiltrating the article material pores with pyrolytic carbon, the free (pore) space of the article is markedly decreased, so that just a small amount of silicon can penetrate therein sufficient for the interaction with the pyrolytic carbon and formation of the silicon carbide layer. And the carbon fibers actually remain unchanged, i.e. the carbon skeleton is retained along with the formation of the second skeleton, a silicon carbide one, which penetrates the first skeleton and supports the whole carbon basis of the article.

The preinfiltration of the pores with pyrolytic carbon increases the total amount of carbon and thereby decreases the consumption of the basis "primary" carbon for forming the silicon carbide skeleton. Due to this the article material finally possesses the properties both of the carbon substituent thereof and the silicon carbide one (high modulus of elasticity and properties retention in oxidizing media), this being attained at a relatively low specific weight of the material having a silicon carbide skeleton.

At the crystallization step of pyrolytic carbon deposited in the coke matrix pores and on the fibers, there occurs an increase in the pyrolytic carbon reactivity required for a rapid formation of SiC while siliconizing, and thereby for preventing the silicon access to the carbon fibers, which are not intended to convert into silicon carbide.

Otherwise the reaction of the fiber carbon with the silicon penetrated leads to the partial or total formation in the article structure of brittle SiC fibers unable to withstand impact and tensile loads, to the violation of the carbon skeleton continuity, and, accordingly, to the partial loss or the material strength properties.

The silicon carbide skeleton which is formed when silicon penetrated into open channels of the article densified pore structure, ensures the article material high rigidity, the article shape and size stability, and the retention of the article load-carrying capacity when the surface protective coating is damaged.

PREFERRED EMBODIMENT OF INVENTION

To realize the claimed process and obtain articles of a carbon-silicon carbide material, a ready of fresh-produced carbon-plastic preform is used having the initial density of 1.25 to 1.45 g/cm$^3$ with the filler content of 57 to 65% by weight, and produced according to the prepreg technology or by impregnating a fibrous component in a mold.

The resulting preform is baked in a furnace in a reducing or neutral atmosphere by steadily heating to the carbonization temperature of 900° to 1100° C. The carbonization results in a preform with a coke matrix reinforced by carbon fibers having 28 to 31% by volume porosity and 1.0 to 1.20 g/cm$^3$ apparent density. The carbonized preform is then subjected to pyrolytic carbon densification by feeding a city gas at the temperature of 960° to 990° C. to the furnace working space.

Generally, the pyrolytic carbon densification parameters are chosen depending on the methane content in the city gas, the furnace size, and the charge amount, as well as on the required degree of the preform infiltration with pyrolytic carbon.

The preform is densified until the pyrolytic carbon weight gain is 10 to 25%.

The pyrolytic carbon deposited in the pore space of the carbonized preform consists of stacks of graphitic layers disposed along the pore perimeters, in the material coke matrix, and in the intertow space of the fibrous basis.

Then the pyrolytic carbon densified preform is subjected to heat treatment at a temperature of 1900° to 2000° C. under vacuum or in an inert gas atmosphere to crystallize the pyrolytic carbon and form pore channels. During the crystallization process, the stacks of graphitic layers are growing (the diameter and height increase), the layers being arranged parallel to each other at a certain interplanar spacing ($d_{002}$ 3.44–3.47 A). Moreover, transport (open) pores appear due to the relaxation of internal stresses in the coke matrix. As a result the preform apparent density becomes 1.24 to 1.48 g/cm$^3$ (depending on the starting filler density).

At the final step the preform is subjected to siliconizing. For this purpose there is prepared a mixture of silicon and boron powders (particles up to 2 mm), taken in the ratio, % by weight:

Silicon ... 85 to 95

Boron ... 5 to 15.

A liquid organic binder is added to the resulting mixture in the amount of 8 to 12% by weight, and prior to siliconizing the mixture is uniformly applied over the preform surface in the amount of 60 to 200% by weight of the preform. The amount of the mixture for each particular preform is defined in terms of data on the preform apparent density after the heat treatment.

Siliconizing is effected under vacuum or in an inert gas atmosphere while heating to the temperature of 1800° to 2000° C. With exposure at the final temperature for 0.5 to 1.5 h. Here the mixture applied onto the preform surface melts and penetrates (as melt or vapors) into the preform open pores. Along the melt and vapors path the interaction of the matrix carbon with the silicon and boron occurs, resulting in silicon carbide veins which constitute the skeleton within the preform pore space. The first silicon carbide layers being formed within the pores from the pyrolytic carbon deposited keep the incoming silicon and boron from penetrating to the preform internal fibrous skeleton.

As a result, the silicon carbide skeleton appears to be "interwoven" between the fiber tows of the article carbon skeleton.

The conduction of the process at the temperature under 1800° C. does not ensure the full conversion of the silicon entered into the pores into carbide owing to the low reaction rate and to the melt lowered penetration capability, whereas at the temperature over 2000° C. a competing reaction occurs of the carbide decomposition into silicon and carbon.

And the resulting carbon in the state of perfect graphite forms zones of decreased strength properties.

The exposure of the article at the final siliconizing temperature favours the completeness of the siliconizing and diffusion processes, and driving-off of the unreacted silicon. The article density in this case amounts to 1.65 to 2.2 g/cm$^3$.

The boron addition, due to the formation of oxides and carbide thereof, increases the material oxidation resistance and positively affects its mechanical properties. The boron content in the mixture over 15%, in view of silicides formation, negatively affects the material strength properties whereas at the content under 5% no boron compounds are formed because of its natural losses caused by evaporation and carrying-over to slags.

To better understand the present invention, given hereinbelow are Examples of the process specific embodiment and obtaining of a carbon-silicon carbide material. Articles (material samples) obtained according to these Examples were subjected to tests wherein the material apparent density at each production step, modulus of elasticity, and ultimate bending strength were measured. Along with the above, the samples were subjected to thermal loading up to 1300° C. in an oxidizing O$_2$ atmosphere, whereupon changes in the sample size and shape, as well as the ultimate bending strength were measured to determine the load-carrying capacity retention for the material having no surface protective SiC layer. The availability and retention of the silicon carbide skeleton in the carbon matrix were assessed in terms of these measurements. However the availability of the skeleton was first determined visually studying the material microsections whereon the silicon carbide veins dispersed in the carbon matrix between the fibers were observed.

EXAMPLE 1

An article in the form of a plate of 200×200×8 mm was produced. A carbon-plastic preform was prepared according to the full cycle prepreg technology. To that end a rayon fiber-based carbon fabric of the TNU-4 (Thy-4) grade was impregnated at 50° C. with a phenol-formaldehyde binder (FN resin giving a coke residue upon carbonizing of 60% by weight) in the amount of 60% by weight. The resulting prepreg was dried at 50° C. for 28 h, followed by exposure in open air for 24 h. Then the prepreg stack of 4 fabric layers was formed following the article shape in a mold. Molding was effected under pressure with exposure at 170° C. for 7 h. The preform was then cooled under pressure for 12 h, resulting in a carbon-plastic preform with the carbon fiber content of 59% by weight and the apparent density of 1.29 g/cm$^3$.

Carbonization was carried out in a coke filling medium, increasing the temperature up to 900° C. at 8° C./h to obtain a perform having the apparent density of 1.03 g/cm$^3$ which was then subjected to pyrolytic carbon densification in an electric vacuum furnace using a city gas, under the pressure of 1333 Pa first at 960° C. for 50 h, then at 990° C. for 90 h. As a result a 15% preform weight gain was attained due to depositing pyrolytic carbon in the pore space thereof.

The pyrolytic carbon crystallization and pore channels formation were effected in an electric vacuum furnace under the residual pressure of 133.3 Pa at 2000° C. for 1 h. The maximum temperature was attained in 20 h. The apparent density after such treatment was 1.25 g/cm$^3$.

Siliconizing was conducted in silicon vapors. To that end the preform was placed into a furnace with crucibles containing silicon being put nearby. The furnace was evacuated and the temperature was increased to 2000° C. at an average rate of 100° C./h. At the final temperature the preform was held for 0.5 h and cooled under vacuum at 100° C./h down to 50° C., whereupon the preform was removed from the furnace.

The resulting material of the apparent density of 2 g/cm$^3$ has the following ration of the components, % by weight:

Carbon fibers . . . 55

Matrix carbon . . . 2

Silicon carbide . . . 43

The material had a static tensile modulus 30×10$^2$ kg/mm$^2$; ultimate bending strength at 20° C.–12 kg/mm$^2$.

The same value found after operating in an oxidizing medium for 1 h at 1300° C.–11 kg/mm$^2$.

The dimensions and shape of the sample remained unchanged.

EXAMPLE 2

A plate of 200×200×8 mm was produced. A carbon-plastic preform was prepared following the procedure of Example 1, except that use was made of a fabric of the TGN-2M (TF-2M) grade and a binder of the LBS (NEC) grade. A preform having the apparent density of 1.27 g/cm$^3$ with the carbon content of 62% by weight was obtained. Upon carbonizing according to the conditions of Example 1 the apparent density was 1.0 g/cm$^3$.

The pyrolytic carbon crystallization was effected at 1900° C. for 1.5 h. The apparent density after that was 1.24 g/cm$^3$. The siliconizing charge was prepared as a mixture of silicon and boron powders having a grain size not over 2 mm at the boron: silicon ratio of 5:95%.

The resulting mixture in the amount of 150% by weight of the preform in a bag made of a graphitized fabric was spread over the preform surface. The furnace temperature was increased following the conditions of Example 1 up to 1870° C. with exposure at that temperature of 1 h.

Upon cooling and removing from the furnace the apparent density of the article was 1.9 g/cm$^3$, at the following ratio of the components, % by weight:

Carbon fibers . . . 44

Matrix carbon . . . 4.9

Silicon carbide . . . 51

Boron compound . . . 0.1

At the following properties of the material:

Modulus of elasticity . . . 4000 kg/mm$^2$

Ultimate bending strength at 20° C. . . . 14 kg/mm$^2$

The same value obtained after operating in an oxidizing medium for 1 h . . . 13 kg/mm$^2$ The sample dimensions and shape remained unchanged.

EXAMPLE 3

The procedure of Example 1 was repeated to obtain an article (prepared as in Example 1). A carbon-plastic preform was prepared following the same procedure, except that a fabric made of high-modulus VMN-4 (BMH-4) fibers was used.

The carbon-plastic preform apparent density was 1.45 g/cm$^3$ at the fiber content of 60% by weight. Upon carbonizing the preform following the procedure of Example 1, the apparent density was 1.2 g/cm$^3$. Upon pyrolytic carbon densification the weight gain was 20%.

After the pyrolytic carbon crystallization and pore channels formation the apparent density became 1.43 g/cm$^3$.

For siliconizing a mixture was prepared from 85% by weight silicon and 15% by weight boron having a particle size not over 500 mcm. The charge in the amount of 100% by weight of the preform was mixed with an organic binder of the KMTs (KMU) grade in the ratio of 1:10. The resulting paste was uniformly spread over the article surface, and siliconizing was carried out at the final temperature of 1800° C. with exposure for 1.5 h.

The resulting article of 1.7 g/cm³ apparent density had the following ratio of the components, % by weight:

Carbon fibers . . . 72

Matrix carbon . . . 0.5

Silicon carbide . . . 25

Boron compound . . . 2.5

At the following properties of the material:

Modulus of elasticity . . . 6000 kg/mm²

Ultimate bending strength at 20° C. . . . 22 kg/mm²

After testing in an oxidizing medium for 1 h . . . 20 kg/mm²

The sample dimensions and shape remained unchanged. Along with the above, there were conducted additional tests for determining the optimal values of the process parameters, in particular the pyrolytic carbon crystallization temperature, as well as a test for conducting this process without such operation, and tests outside the optimal temperature of the preform siliconizing. The results obtained are presented in Table 1. All the remaining conditions repeated those of Example 2.

Moreover, a test on burning-out (in open atmosphere) of the material carbon basis was carried out. For that purpose, a sample of 100×10×5 mm was heated to 1200° C. with exposure at that temperature for 5 h.

TABLE 1

| Nos. of Examples | Temperature of pyrolytic carbon crystallization, °C. | Temperature of siliconizing °C. | Apparent density, g/cm³ | Modulus of elasticity kg/m² | Ultimate bending strength, kg/mm² | |
|---|---|---|---|---|---|---|
| | | | | | Prior to testing | After testing in O₂ at 1300° C. for 1 h |
| 4 | 2 100 | 1 900 | 2,3 | 3 000 | 7,0 | 4,0 |
| 5 | 1 800 | 1 900 | 1,58 | 200 | 7,5 | 3,0 |
| 6 | | 1 900 | 1,55 | 700 | 6,0 | 2,0 |
| 7 | 1 900 | 1 750 | 1,59 | 600 | 8,0 | 5,0 |
| 8 | 1 900 | 2 050 | 1,60 | 700 | 5,0 | 3,0 |

After testing the sample retained its shape and dimensions, however the surface microrelief had a spongy structure (silicon carbide skeleton).

The resulting material had the following ratio of the components, % by weight:

Carbon fibers . . . 9.9

Matrix carbon . . . 0.1

Silicon carbide . . . 89

Boron compound . . . 1.0 at the apparent density of 1.5 g/cm³, modulus of elasticity of 1800 g/mm², and the ultimate bending strength of 8 kg/mm².

The results obtained suggest that the material produced according to the described technology, due to the silicon carbide skeleton availability therein, is operable under extreme conditions even in case of damage of the surface protective SiC layer, at least, till the working cycle of thermal loading in an oxidizing medium is completed.

INDUSTRIAL APPLICATION

The presently claimed invention is useful in the machine building, aircraft, and other industries where carbon materials are used at high temperatures. The material can be protected with a surface SiC layer or another refractory coating.

We claim:

1. A process for producing articles of a carbon-silicon carbide composite material, which comprises preparing a carbon-plastic preform from carbon fibers and a thermosetting binder, heat pretreating thereof to form a coke matrix reinforced by carbon fibers, followed by densifying the coke matrix and siliconizing, characterized in that said densifying of the coke matrix reinforced by carbon fibers is effected via pyrolytic carbon infiltration wherein the pyrolytic carbon weight gain is about 10–25 percent, with crystallization of the deposited pyrolytic carbon and the formation of pore channels via heat treating the densified preform at 1900°–2000° C. being performed prior to said siliconizing, and under the siliconizing conditions a silicon carbide skeleton is formed as a result of interaction between the silicon and carbon.

2. A process according to claim 1, characterized in that the siliconizing charge is prepared as a mixture of boron and silicon powders taken in the following ratio, % by weight:

Silicon . . . 85 to 95

Boron . . . 5 to 15.

3. A process according to claim 2, characterized in that said mixture of powders is prepared using an organic binder, and prior to siliconizing said mixture of powders is uniformly spread directly over the article surface, and said siliconizing is carried out at a temperature of from 1800° to 2000° C.

4. A carbon-silicon carbide composite material, which comprises a first skeleton of carbon fibers disposed in a carbon matrix with silicon carbide, wherein the carbon matrix comprises intercommunicating pore channels and wherein said silicon carbide fills the pore channels and thereby forms a second skeleton inside said carbon matrix.

5. The carbon-silicon carbide composite material of claim 4, wherein said composite material comprises the following components in % by weight:

| Carbon fibers | 30–72 |
|---|---|
| Matrix carbon | 0.5 to 5 |
| Silicon carbide | 25 to 65 |
| Boron compound(s) | 0 to 2.5. |

6. The carbon-silicon carbide composite material of claim 5, wherein the carbon fibers are in the form of a woven fabric.

* * * * *

UNITED STATES PATENT AND TRADEMARK OFFICE
CERTIFICATE OF CORRECTION

PATENT NO. : 5,635,300
DATED : June 3, 1997
INVENTOR(S) : KOSTIKOV ET AL

It is certified that error appears in the above-indentified patent and that said Letters Patent is hereby corrected as shown below:

Title page, column 1, after item [30],
Foreign Application date "Dec. 30, 1994" should be
--Dec. 30, 1992--

Signed and Sealed this

Nineteenth Day of May, 1998

Attest:

BRUCE LEHMAN

Attesting Officer

Commissioner of Patents and Trademarks